US008385335B2

(12) United States Patent
Assarpour

(10) Patent No.: US 8,385,335 B2
(45) Date of Patent: *Feb. 26, 2013

(54) METHOD AND APPARATUS FOR PROVIDING FAST REROUTE OF A UNICAST PACKET WITHIN A NETWORK ELEMENT TO AN AVAILABLE PORT ASSOCIATED WITH A MULTI-LINK TRUNK

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/772,482

(22) Filed: May 3, 2010

(65) Prior Publication Data
US 2010/0290469 A1   Nov. 18, 2010

Related U.S. Application Data

(60) Provisional application No. 61/178,016, filed on May 13, 2009.

(51) Int. Cl.
*H04L 12/28* (2006.01)
*H04L 12/26* (2006.01)

(52) U.S. Cl. ............... 370/389; 370/217; 370/225

(58) Field of Classification Search ............ None
See application file for complete search history.

(56) References Cited

U.S. PATENT DOCUMENTS

| 6,185,214 | B1 * | 2/2001 | Schwartz et al. | 370/401 |
|---|---|---|---|---|
| 7,072,293 | B2 * | 7/2006 | Hunter et al. | 370/218 |
| 7,412,557 | B2 * | 8/2008 | Di Benedetto et al. | 710/316 |
| 7,580,407 | B2 * | 8/2009 | Shimada | 370/389 |
| 7,606,927 | B2 * | 10/2009 | Tasman et al. | 709/232 |
| 7,944,913 | B2 * | 5/2011 | Ogasahara | 370/386 |
| 8,102,848 | B1 * | 1/2012 | Rao | 370/390 |
| 8,165,122 | B2 * | 4/2012 | Kotalwar et al. | 370/390 |
| 2002/0071386 | A1 * | 6/2002 | Gronke | 370/217 |
| 2003/0142680 | A1 * | 7/2003 | Oguchi | 370/400 |
| 2005/0050221 | A1 * | 3/2005 | Tasman et al. | 709/232 |
| 2006/0072574 | A1 * | 4/2006 | Akahane et al. | 370/392 |
| 2006/0206656 | A1 * | 9/2006 | Di Benedetto et al. | 710/316 |
| 2006/0274647 | A1 * | 12/2006 | Wang et al. | 370/216 |

(Continued)

FOREIGN PATENT DOCUMENTS

EP    1 729 461 A1    12/2006
GB    2 406 742 A     4/2005

(Continued)

OTHER PUBLICATIONS

European Search Report dated Aug. 26, 2010.

*Primary Examiner* — Hassan Phillips
*Assistant Examiner* — Hicham Foud
(74) *Attorney, Agent, or Firm* — Anderson Gorecki & Rouille LLP

(57) ABSTRACT

A method, apparatus and computer program product for providing fast reroute of a packet is presented. A unicast packet is received by an FDU in a data plane of a network element and a destination is determined for the packet. A lookup is performed in a port state table maintained by the FDU to determine an available local port that is in an UP state for the destination, and if no local port is UP, then a lookup is performed in the port state table to determine an available remote port that is in an UP state for the destination. If a port in the UP state cannot be determined for the unicast packet, then the packet is dropped.

21 Claims, 12 Drawing Sheets

U.S. PATENT DOCUMENTS

| | | | |
|---|---|---|---|
| 2007/0086361 A1* | 4/2007 | Allan et al. | 370/254 |
| 2007/0268915 A1* | 11/2007 | Zelig et al. | 370/401 |
| 2008/0037544 A1* | 2/2008 | Yano et al. | 370/392 |
| 2008/0049778 A1* | 2/2008 | Yano et al. | 370/422 |
| 2008/0075076 A1* | 3/2008 | Shimada | 370/389 |
| 2008/0267078 A1* | 10/2008 | Farinacci et al. | 370/244 |
| 2008/0285555 A1* | 11/2008 | Ogasahara | 370/389 |
| 2008/0310299 A1* | 12/2008 | Saleh et al. | 370/221 |
| 2010/0040062 A1* | 2/2010 | Tasman et al. | 370/392 |
| 2010/0054251 A1* | 3/2010 | Lee et al. | 370/392 |
| 2010/0165989 A1* | 7/2010 | Jain et al. | 370/390 |
| 2010/0303071 A1* | 12/2010 | Kotalwar et al. | 370/390 |
| 2011/0255534 A1* | 10/2011 | Yano et al. | 370/389 |
| 2011/0261812 A1* | 10/2011 | Kini et al. | 370/389 |

FOREIGN PATENT DOCUMENTS

WO    WO 00/72531    11/2000

* cited by examiner

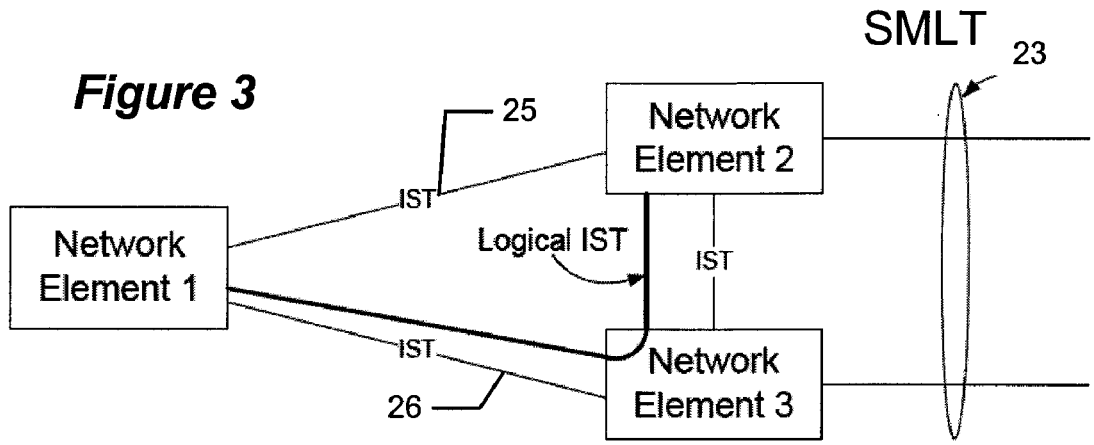
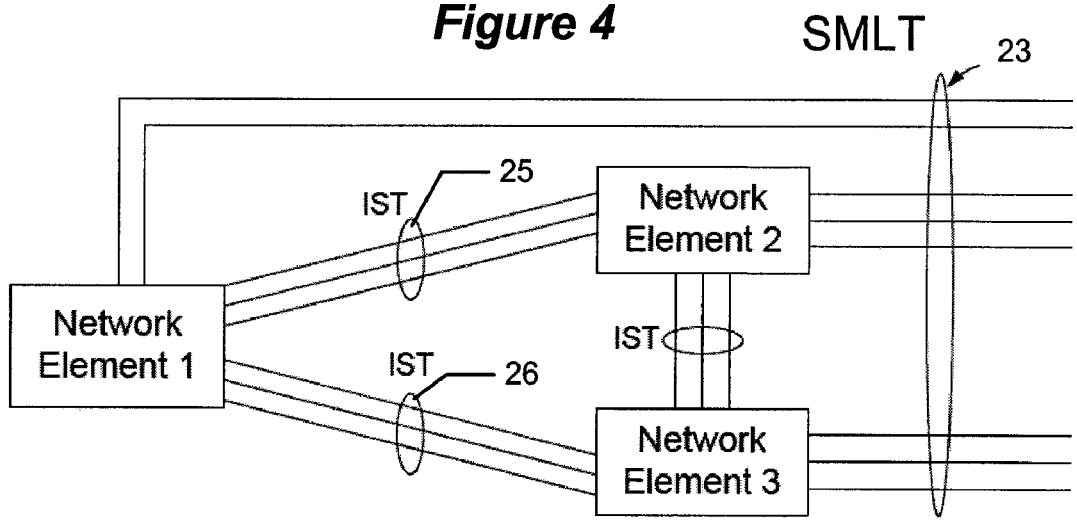

METHOD AND APPARATUS FOR PROVIDING FAST REROUTE OF A UNICAST PACKET WITHIN A NETWORK ELEMENT TO AN AVAILABLE PORT ASSOCIATED WITH A MULTI-LINK TRUNK

CROSS REFERENCE TO RELATED APPLICATIONS

The present application claims the benefit of U.S. Provisional Patent Application No. 61/178,016, filed on May 13, 2009. This application also relates to the application titled "Method And Apparatus For Maintaining Port State Tables In A Forwarding Plane Of A Network Element", filed on the same date as the present application. The teachings and disclosure of the above-identified applications are each incorporated by reference herein in their entirety.

BACKGROUND

Data communication networks may include various computers, servers, nodes, routers, switches, hubs, proxies, and other devices coupled to and configured to pass data to one another. These devices are referred to herein as "network elements," and may provide a variety of network resources on a network. Data is communicated through data communication networks by passing protocol data units (such as packets, cells, frames, or segments) between the network elements over communication links on the network. A particular protocol data unit may be handled by multiple network elements and cross multiple communication links as it travels between its source and its destination over the network. Hosts such as computers, telephones, cellular telephones, Personal Digital Assistants, and other types of consumer electronics connect to and transmit/receive data over the communication network and, hence, are users of the communication services offered by the communication network.

Network elements are typically implemented to have a control plane that controls operation of the network element and a data plane that handles traffic flowing through the network. The data plane typically will have a collection of line cards having ports that connect to links on the network. Data is received at a particular port, switched within the data plane, and output at one or more other ports onto other links on the network. To enable the data to be handled quickly, the data plane is typically implemented in hardware so that all of the decisions as to how to handle the data are performed using hardware lookups, etc.

In the event a port fails, traffic flowing through the port should be diverted to flow out an alternate port to enable connectivity to be restored through the network. To minimize impact on the traffic being handled by the network element, e.g. to minimize downtime and packet loss, the quicker the rerouting of traffic can occur the better. Preferably, it would be advantageous to enable the traffic to fail over to an alternate port in under 10 milliseconds (ms). Preferably, the traffic should be spread across the remaining ports rather than all moved from the failing port to a particular designated alternate port to prevent the designated alternate port from being overloaded.

Ports can fail for many reasons, including line card failure, failure of the link connected to the port (e.g. line cut), far-end line card failure, etc. The terms multi-link trunk (MLT), Link Aggregation Group (LAG) and logical ports are synonymous and these terms are used interchangeably Likewise, the internal forwarding datapath within the network element may fail which may cause a port or set of ports to appear to have failed, or there may be some other failures along the logical/virtual connection to the port's external peer endpoint. There are numerous reasons why a port may fail.

In the event a port fails, traffic destined to the port should be diverted to flow out an alternate port to enable connectivity to be restored through the network. To minimize impact on the traffic being handled by the network element, e.g. to minimize down-time and packet loss, the quicker the rerouting of traffic can occur the better. Preferably, it would be advantageous to enable the traffic to fail over to an alternate port in under ten milliseconds (ms). Preferably, in the case of LAG or MLT, the traffic should be spread across the remaining ports rather than all moved from the failing port to a particular designated alternate port to prevent the designated alternate port from being overloaded with traffic.

SUMMARY

Conventional mechanisms such as those explained above suffer from a variety of deficiencies. One such deficiency is the amount of time taken by conventional network elements to recover from a failure. The longer the amount of time taken to recover the longer the delay in performance (including more dropped packets) as well as the loading of other ports to overcome for the failed port. Current solutions do not provide a comprehensive method to efficiently detect port failures and distribute port states to enable fast reroute during packet/cell/frame forwarding. These solutions typically make extensive use of management and/or control plane software to handle a subset of failures. Their approach results in much longer network down time and higher packet loss.

Embodiments of the invention significantly overcome such deficiencies and provide mechanisms and techniques that provide a method and apparatus for maintaining port state tables in a forwarding plane of a network element. It is very critical to minimize network down time and packet loss, and provide seamless failover in network devices when such failures occur. This invention allows very fast and efficient detection and distribution of the port states within a cluster of nodes. This mechanism enables the fast path to perform seamless fast reroute in the advent of such failures without dynamic assistance from management and/or control plane software.

Other embodiments include a computer readable medium having computer readable code thereon for providing fast reroute of a unicast packet within a network element to an available port associated with a multi-link trunk. The computer readable medium includes instructions for receiving a unicast packet by the FDU in a data plane of a network element and determining a destination for the packet. The computer readable medium further includes instructions for performing a lookup in a port state table maintained by the FDU to determine an available local port that is in an UP state for the destination, and if no local port is UP, then performing a lookup in the port state table to determine an available remote port that is in an UP state for the destination. Additionally, the computer readable medium includes instructions for forwarding the packet when a port in the UP state is determined for the unicast packet or dropping the packet when a port in the UP state cannot be determined for the unicast packet.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides fast reroute of a unicast packet within a network element to an available port associated with a multi-link trunk as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing fast reroute of a unicast packet within a network element to an available port associated with a multi-link trunk as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a functional block diagram showing another example of organizing a cluster of nodes;

FIG. 4 is a functional block diagram showing another example of organizing a cluster of nodes;

DETAILED DESCRIPTION

Figure 1:
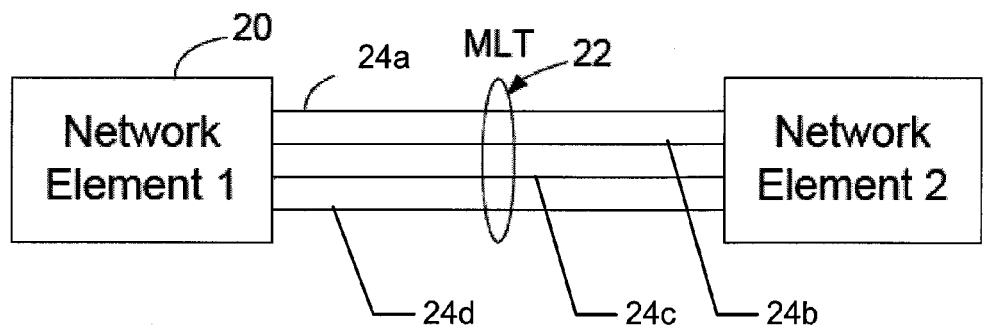
FIG. 1 is a functional block diagram showing a first example of organizing a cluster of nodes.

Over time, the manner in which network elements handle data has evolved. For example, two or more physical links may extend between a group of network elements and be used collectively as a MLT or LAG. FIG. 1 shows an example of two network elements (network element 1 and network element 2) connected by multiple links 24*a-d* that have been grouped to form a multi-link trunk 22. In particularly, each of the links 24*a-d* in the MLT 22 may be used by either of the network elements to forward data to the other. Thus, if network element 1 has data (e.g. a frame/packet) to send to network element 2, network element 1 may select one of the links 24*a*-24*d* from the MLT 22 and transmit the packet over that link to network element 2.

Figure 2:
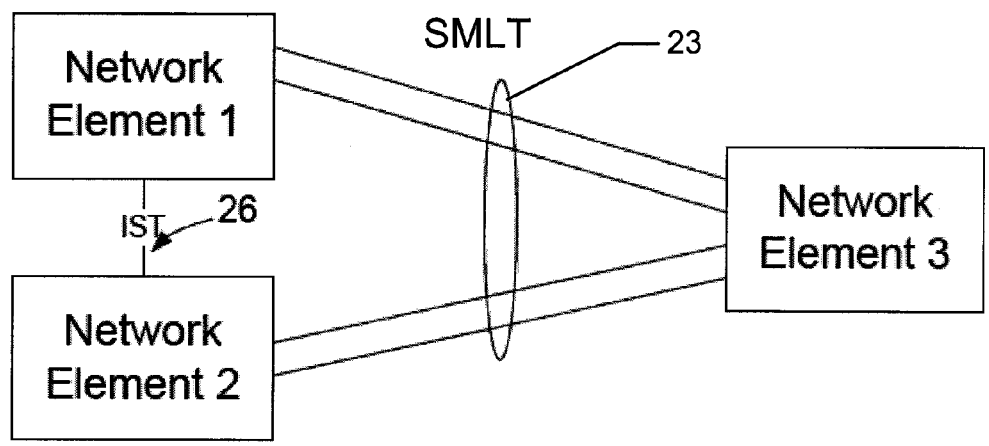
FIG. 2 is a functional block diagram showing another example of organizing a cluster of nodes.

FIG. 2 shows another example way in which network elements may be interconnected. Specifically, in this example network element 1 and network element 2 are interconnected by an inter-switch trunk (IST) 26 which may be a single link or itself may be a multi-link trunk. When the links of a multilink trunk are physically connected to two different network elements, the MLT is called a Split Multi-Link Trunk (SMLT). Network elements 1 and 2 may each have one or more links that connects to network element 3, which may be grouped together to form a SMLT 23. Thus, if network element 1 has data (e.g. a frame/packet) to send to network element 3, network element 1 may either select one of the SMLT links connected to it or may transmit the packet on one of the links associated with the Inter-Switch Trunk 26 to enable the network element 2 to forward the data on one of its links associated with the SMLT to network element 3.

FIG. 3 shows another example in which network element 1 does not have any links connected to the SMLT 23, but is connected by ISTs 25 and 26 to two other network elements (network element 2 and network element 3) that do have ports connected to the links associated with the SMLT. In this scenario, if network element 1 has data to send on the SMLT, it will select one of the IST links (note that each IST link may itself be a SMLT) and forward the data on to either network element 2 or 3. The ISTs may be physical and extend directly between two network elements or may be logical and extend on tunnels through one or more intermediate network elements.

FIG. 4 shows another example in which network element 1 also participates in the SMLT 23. In this instance, if network element 1 has data to send, it may forward the data on one of its links associated with the SMLT 23 or may forward the data on one of the links associated with one of the ISTs 25 or 26 to enable the data to be forwarded on the SMLT 23.

Figure 5:
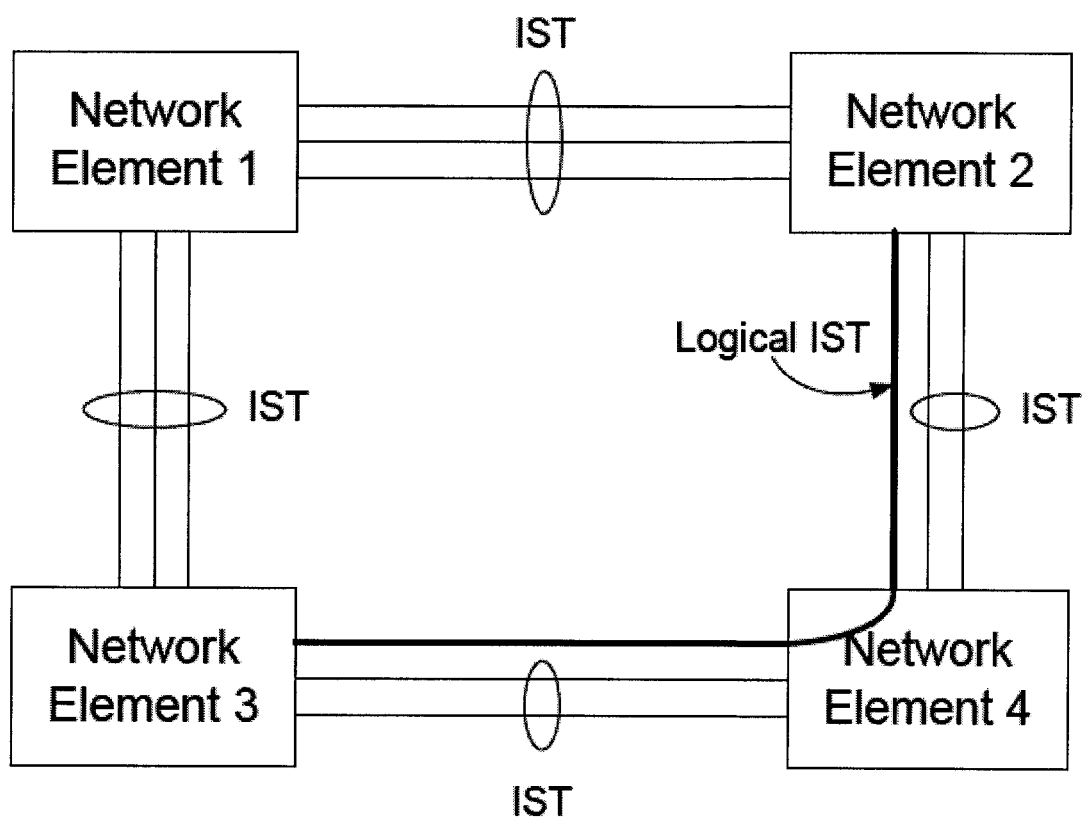
FIG. 5 is a functional block diagram showing another example of organizing a cluster of nodes.
Figure 6:
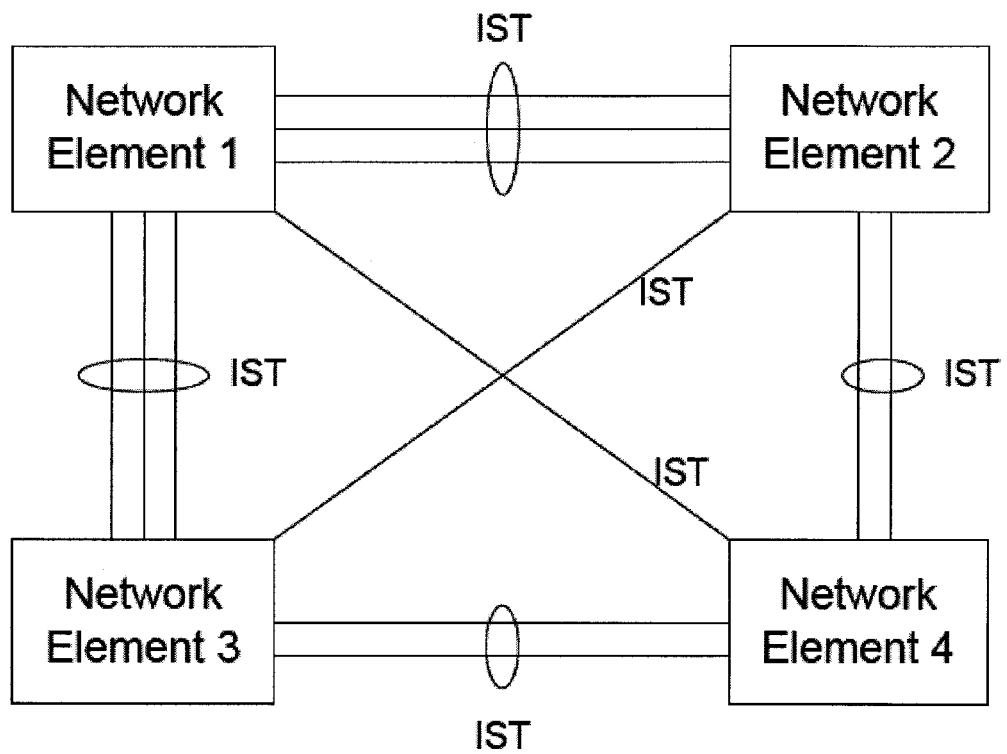
FIG. 6 is a functional block diagram showing another example of organizing a cluster of nodes.

FIGS. 5 and 6 show another way of interconnecting network elements in a square SMLT arrangement. In the arrangement shown in FIG. 5, four network elements are interconnected via ISTs 25-28 in a square arrangement, and in FIG. 6 the four network elements are interconnected via ISTs 25-28 in a meshed arrangement. The ISTs may be physical and extend directly between two network elements or may be logical and extend on tunnels through one or more intermediate network elements.

Although several examples of ways in which network devices may be interconnected have been shown, there are other ways to interconnect a cluster of network elements as well and this example set of interconnection architectures is not intended to be exhaustive. Thus, these examples were merely intended to provide a representative example of a few ways of interconnecting network elements. A group of network elements will be referred to herein as a cluster.

Figure 7:
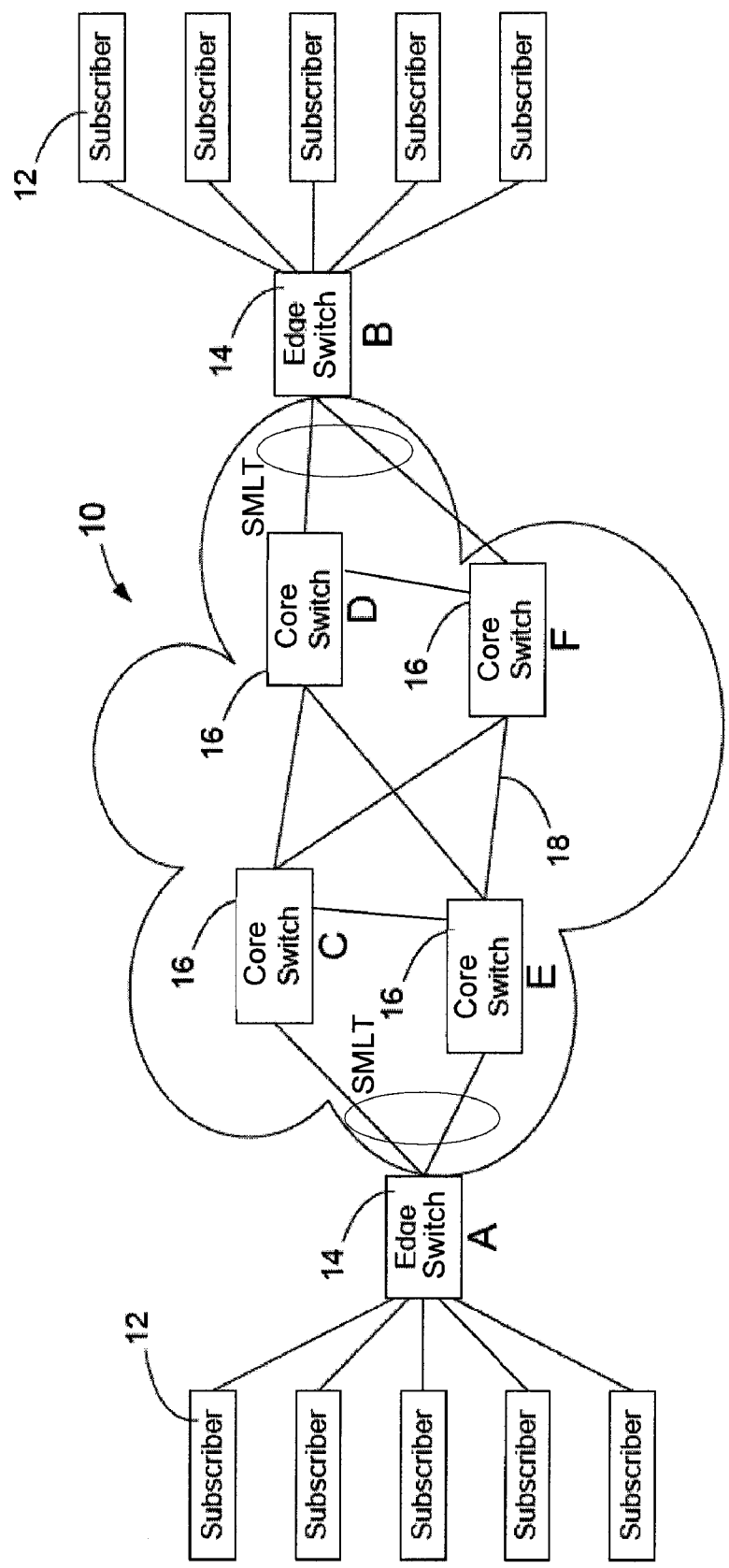
FIG. 7 is a functional block diagram of an example communication network.

FIG. 7 shows an example communication network 10 in which subscribers 12 connect to an edge switch 14. The edge switch 14 connects to core switches 16 which forward data through the network on links 18. Each of these switches may be a physical rouswitchter or may be multiple devices connected together to operate as a cluster. Each of the links 18 may be a MLT or, where the router/switch is implemented as multiple physical devices, may be a SMLT. From a network routing standpoint, there may be multiple ways for a packet to traverse the network. For example, in FIG. 7 the edge switch A may be able to transmit a packet to edge switch B through core switches C and D or, alternatively, may be able to transmit the packet through core switches E and F. A network layer routing protocol may be used to determine the path to be used for transmission of the packet.

As noted above, depending on the manner in which the network elements are interconnected, there may be many ways for the network element to forward a frame/packet to enable the frame/packet to reach its destination. As used herein, the term "cluster" is used to refer to one or more nodes providing node-level resiliency at the network level. Thus, in FIG. 1, network element 1 would be a cluster; in FIG. 2 network elements 1 and 2 would be a cluster, and in FIGS. 3 and 4 network elements 1, 2, and 3 would be a cluster and in FIGS. 5 and 6 network elements 1-4 would be a cluster. As noted above there are other ways of organizing nodes within a cluster.

Logical connections between the cluster nodes are referred to herein as Inter-Switch Trunks (ISTs). ISTs may be physical links that extend from one network element to a neighboring network element in the cluster, or may be logical links that tunnel through one or more intermediate network elements within the cluster. The node that receives a packet from a non-IST port will be referred to as a local node. All other nodes within the cluster are referred to as remote nodes with respect to the received packet.

Two or more links may be grouped to form a Multi-Link Trunk (MLT). Each MLT will be assigned a MLT group ID (MLT-ID), which is a global value within the cluster and unique across the cluster nodes. An MLT with all its port members only on one node is referred to as a normal MLT group. An MLT group where its port members are on two or more nodes is referred to as a Split MLT or SMLT group.

When a logical port is implemented as a MLT or SMLT, there are actually multiple physical ports that are capable of forwarding a packet to its next hop on the network. Accordingly, if one of the ports of a MLT/SMLT fails, it would be advantageous to cause the packet to be forwarded on one of the remaining ports so that the packet can traverse the network rather than being dropped. Likewise, rather than designate a primary and backup port for each port in the MLT/SMLT, it would be advantageous to load share the packets across the remaining ports of the MLT/SMLT so that the packets may be distributed across the remaining ports that are UP. According to an embodiment, this process is implemented in hardware so that the fastpath (dataplane) can automatically accommodate individual and multiple port failures and automatically redirect packet traffic across the remaining ports in an equitable manner.

Figure 8:
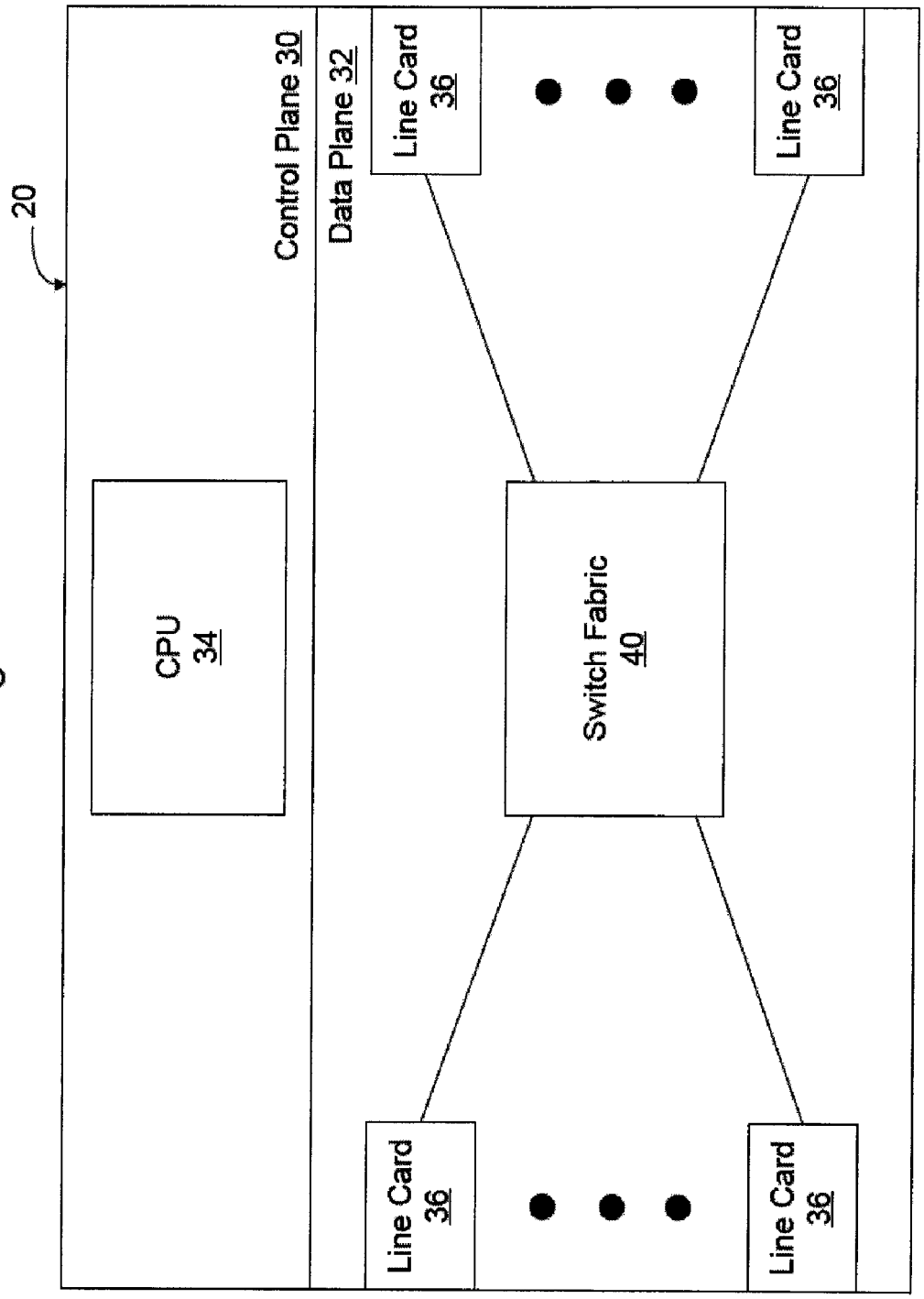
FIG. 8 is a functional block diagram of an example network element.

FIG. 8 shows a functional block diagram of an example network element 20 which may be used as any of the network elements shown in any of FIGS. 1-6. In the example shown in FIG. 8, the network element includes a control plane 31 and a data plane 32. The control plane has one or more CPUs 34 and generally run control processes such as routing processes, management processes, etc. The control plane programs the data plane to instruct the data plane how to forward data on the network.

The data plane 32 may be constructed using many different architectures and the example shown in FIG. 8 is only one example of one such architecture. In the example shown in FIG. 8, the data plane includes a plurality of line cards 36 each of which implements multiple physical ports which connect to links in the network. The line cards in this embodiment are interconnected by a switch fabric 40, although in other embodiments the line cards may be directly interconnected and perform switching functions in a distributed manner.

Figure 9:
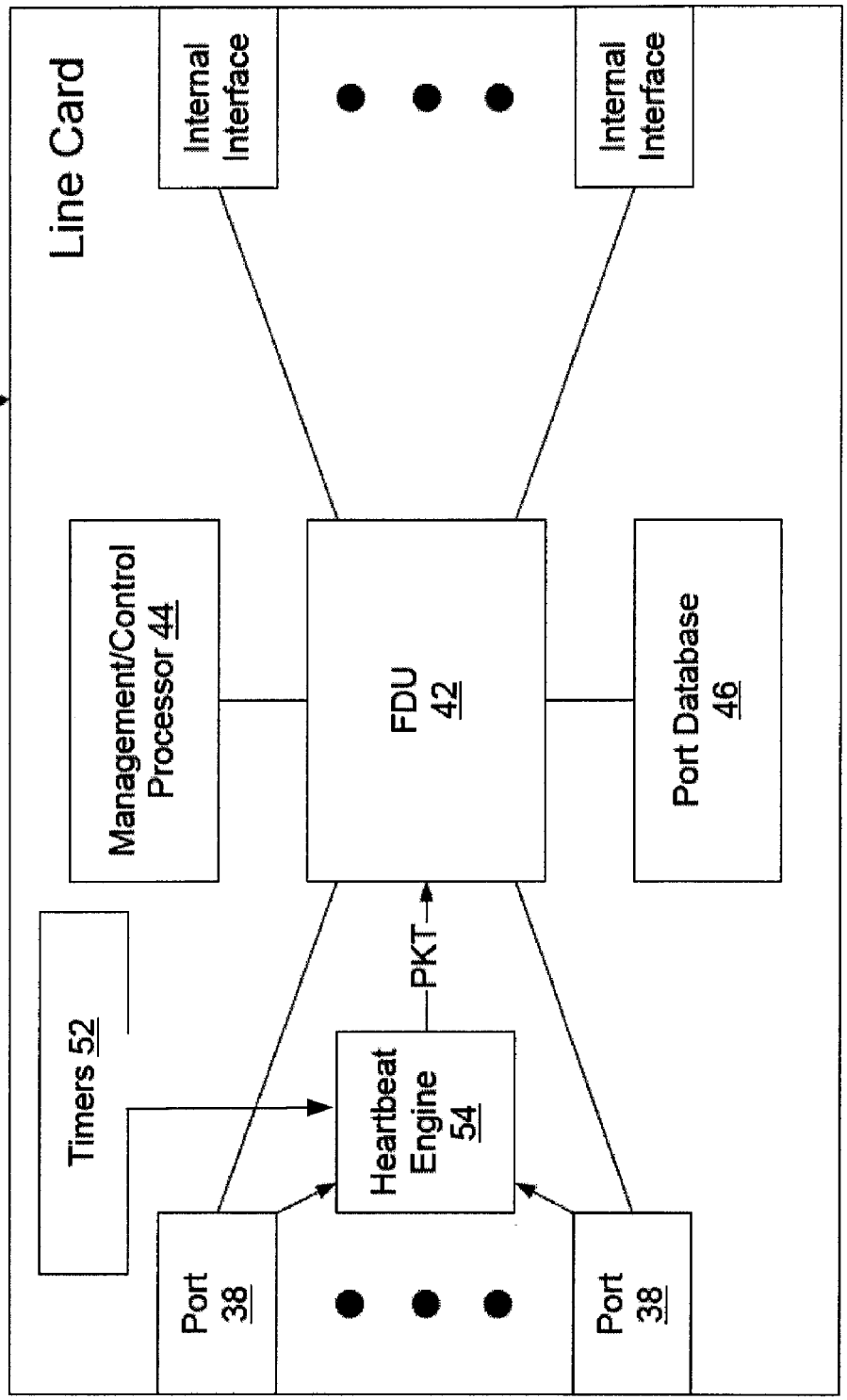
FIG. 9 is a functional block diagram of an example line card that may be used in a network element such as the network element of FIG. 8.

As shown in FIG. 9, each line card 36 includes a plurality of ports 38 which physically connect to the links on the network. The line card also includes one or more functional units 42 that process packets received from the attached ports. As used herein, the functional unit that processes packets from attached ports in both ingress and egress directions, and makes forwarding decisions, is referred to as a Forwarding Datapath Unit or FDU 42. The line card may also include a CPU 44 that interacts with the control plane to enable the control plane to program instructions into the FDU 42 and optionally other components on the line card so that the FDU 42 will handle data appropriately on the network. The CPU 44 also periodically checks the status of the FDU 42 and other components of the line card to detect when a failure occurs.

Figure 10:
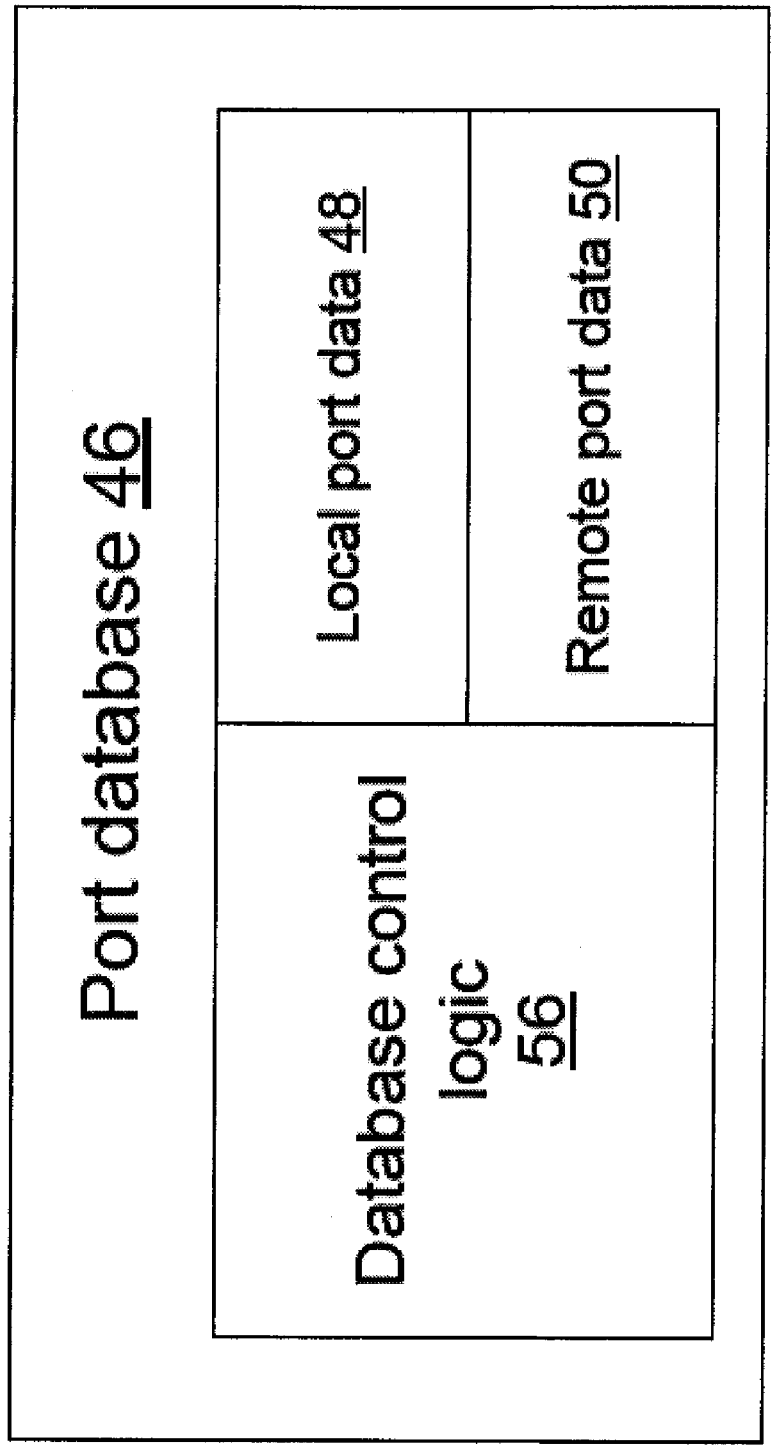
FIG. 10 is a functional block diagram of an example port database that may be used in a line card such as the line card of FIG. 9.

Each FDU 42 maintains a port state database 46. This port state database 46 maintains the physical link states and connection states for its local as well as all remote ports. As shown in FIG. 10, the port state database 46 includes two tables—a local port data table 48 and a remote port data table 50. The local port data table 48 maintains the port states belonging to the local node, and the remote port data table 50 maintains the port states belonging to the remote nodes within the cluster. In the case of MLT groups, the FDU keeps the MLT port members on the local node in the local table, and the port members on all other remote nodes in the remote table.

When the FDU receives a packet, it is required to find a port within the MLT (or SMLT) that is UP to forward the packet on toward its destination on the network. As noted above, where all the ports on the MLT are local, the FDU will need to determine which of the local ports is in the UP state so that it does not attempt to forward the packet over a port that is DOWN. Likewise, where the ports associated with the MLT are not all local (e.g. SMLT), the FDU will need to select a port on a separate physical network element that is associated with the SMLT and has an UP state.

According to an embodiment, each FDU maintains a port state database 46 that it uses to maintain the state of each port within the cluster. The database maintains the physical link states and connection states for its local as well as all remote ports. The database includes two tables—namely a local table 48 and remote table 50. The local table maintains the port states belonging to all FDUs on the local node, and the remote table maintains the port states of all ports on all remote nodes within the cluster. In the case of MLT groups, the FDU keeps the state of the MLT port members that are on the local node within the local table, and keeps the state of the MLT port members that are on all other remote nodes in the remote table. The local table also maintains the state of all IST ports. When a packet is received, the FDU will use the port state database to determine a port for the packet that is UP and forward the packet to that port to be output on the network.

Since the port state database 46 is used by the FDU 42 to make forwarding decisions, it is important to keep the port state table updated, so that it contains current information about the state of each of the ports. Since each line card has one or more FDU, each FDU (in each line card) is required to synchronize with the FDUs in all other line cards within the local network element as well as with all other FDUs in other network elements within the cluster.

In one embodiment, each line card maintains heartbeat timers. Each time a particular one of the heartbeat timers expires, a heartbeat engine 54 generates a heartbeat packet and sends the heartbeat packet to the local FDU 42 on that line card. The heartbeat packet carries the local physical link status of all ports on the line card to inform the local FDU of the state of the ports on that line card. The packet indicates the Global Port ID (GPID) and a network element ID. The FDU uses this state to update its local port state database. The FDU will also forward the packet to all of the other FDUs within the local node, as well as to all other FDUs on other nodes within the cluster. Each FDU uses the port state carried by the packet to update its port state database.

In addition to maintaining a timer associated with collecting/reporting its own port state information, each line card/FDU will also maintain a set of timers associated with all other FDUs within the local node and all other FDUs on other nodes within the cluster. Each FDU expects to receive periodic heartbeat packets from every other local and remote FDU. Thus, a local reception timer is maintained per FDU (for each FDU on the local network element as well as for each FDU on each remote network element within the cluster). A FDU failure (local or remote) is detected if the corresponding reception timer expires. Where a heartbeat packet is not received before expiration of the reception timer, each port associated with the FDU will be set to DOWN so that packets are not sent to ports associated with that FDU until it is restored.

The heartbeat packets allow the FDUs to convey state information to each other and allow each FDU to know the state of all ports in the dataplane. As described below, this allows the dataplane to automatically adjust to port failures so that data may be redirected to ports that are UP and away from ports that are DOWN. All this happens without intervention from the control plane and, hence, the control plane is not notified of a failure of a particular port/line card. To enable the control plane to learn of dataplane failures, the management/control processor 44 periodically injects and extracts heartbeat packets into and out of its local FDU 42. Each injected heartbeat packet completely loops through the target FDU and associated ports and then is extracted back to the processor. The management heartbeat packet traverses all functional blocks in both ingress and egress datapaths. Each time the control processor injects a management heartbeat packet of this nature, it kicks off its corresponding reception timer. The control processor detects a failure of the line card if the reception timer expires. The processor uses this information to set a system alarm which will be conveyed to the control plane 30. The control plane may thus learn about a data plane failure. However, since the dataplane has a self-healing mechanism to accommodate port failures and redirect traffic accordingly, the control plane is not required to be involved in redirecting traffic and, hence, notification of the control plane of the failure is not critical to restoration of traffic through the network element.

Heartbeat packets are also used by each FDU to determine the state of its ports. In one embodiment, each FDU maintains a pair of timers per attached port that is configured in a logical/virtual connection. One of the timers is used to generate heartbeat packets to be sent over the connection. The other timer (reception timer) is used to detect connection failure. This timer expires if the heartbeat packet from the other endpoint of the connection is not received in time. The FDU updates its port state table with the arrival of heartbeat packets and reception timer expirations.

Each FDU on each line card maintains its own port state table 46. This table maintains the physical link states and connection states for its local ports as well as all remote ports of all FDUs in the cluster. The FDU uses the received heartbeat packets and timer expiration messages (due to connection time-out or remote FDU failure) to update the table. The table is partitioned into two segments: port states belonging to local node and port states belonging to the remote nodes. The port state table also maintains MLT and SMLT group information. The port state table is used by the forwarding logic to perform fast reroute as explained in greater detail below.

Figure 11:
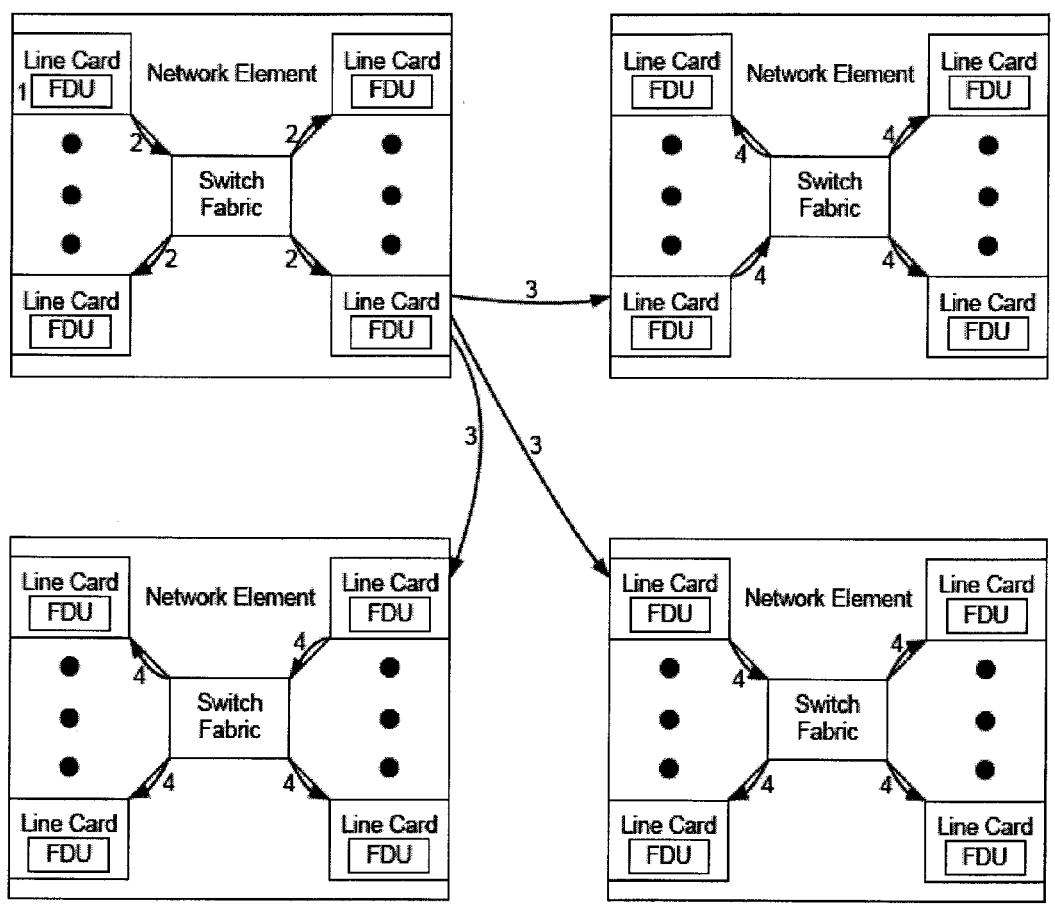
FIG. 11 is a functional block diagram of an example cluster of network elements showing the flow of port state information between the components of the datapath within the node cluster.

FIG. 11 shows dissemination of the port state packet within a cluster of four nodes, in which the dark arrows represents the flow of the port state packet to all FDUs in the cluster. As shown in this figure, packet 1 will be generated containing the state of each port associated with a particular FDU. This packet is shown with reference numeral 1 in the top left line card of the top left network element. This packet will be passed to the FDU so that the FDU can update its port state database to reflect the current status of its ports. The packet will then be passed to each of the other FDUs within the local node (arrows 2). In one embodiment this may be implemented by causing the packet to be broadcast by the switch fabric to all other FDUs within the local node. The packet will also be forwarded to other nodes within the cluster (arrows 3) so that the state of the port may be distributed (arrows 4) to each FDU associated with each node of the cluster. Whenever a FDU receives a packet containing port state information, it will use the information to update its own port state database. This enables the port state database of all FDUs in the cluster to be synchronized.

There may be several network elements within a cluster, multiple FDUs within a network element, and multiple ports supported by each FDU. To enable each node to keep track of which FDUs have provided state packets, and to correlate particular port state packets with particular FDUs, a numbering scheme may be implemented. Preferably the numbering scheme is implemented to be cluster wide unique so that each FDU within the cluster may be uniquely identified. In one embodiment, the port state packet carries information about each of its ports. The packet will specify the source node ID and the Global Port ID (GPID). The Global Port ID is the globally unique identifier (globally unique within a node) that enables the port to be uniquely identified within the port database.

The previous messages described how the FDUs exchanged messages to enable port state to be synchronized between ports in the datapath. In operation, this port state information will enable the FDUs to select an available port for a particular data packet with confidence that the selected port is UP. As ports go Down, the FDUs in the cluster will stop selecting those ports and will instead select alternate ports within the MLT/SMLT associated with the down port to be used to handle the packet. Accordingly, the datapath is able to automatically accommodate port failures, line card failures, etc., to reroute packets to available alternate ports without involvement of the control plane. Hence, rerouting of packets may be done quickly within a network element and between clusters of network elements in fewer than 10 ms.

When a FDU receives a data packet it will read the port ID, MLT-ID, and hash function, and pass the these values to the port state database. The port state database will search first for a local port that is associated with the MLT-ID and which is UP, and then send for a remote port that is associated with the MLT and is UP. In one embodiment, the port state table is designed to offload port selection processing from the FDU. In this embodiment, the FDU passes a request for a port to the port state table and the port state table intelligently implements the request to return a port that is guaranteed to be UP, which is part of the MLT/SMLT, and with preference to use of local ports over remote ports. Additionally, where the port is on a remote node, the port state table will check to find an IST port that is UP over which the FDU can forward the packet to the remote node, so that the remote node can forward the packet on the remote port. Thus, the port state table not only determines whether there is an available remote port, but also whether there is an available IST port that the FDU can use to pass the packet to the remote node for forwarding over the remote port.

FIG. 10 shows an embodiment that may be used to offload port selection from the FDU. In the embodiment shown in FIG. 10, the port database includes database control logic 56 configured to receive requests for port selection from the FDU and return an available port if one exists. The port database may need to make multiple database access operations/calls to the local and remote port tables to determine which port should be returned in response to the port selection request. The database control logic controls execution of this process, optionally under the control of the FDU, to automate the process of selecting a port.

The database control logic may be implemented in hardware and perform data accesses in the local and remote tables which are also implemented in hardware. As ports fail, the status (UP/Down) of the port will be reflected in the port state table. The FDU will perform a port access operation via the database control logic into the port state table whenever the FDB lookup returns a destination that is part of an MLT/SMLT group. Accordingly, rather than having the FDU determine the port from the FDB (which is updated by the control pane and, hence, is relatively slow), the FDU uses the FDB to determine the receiver and then separately determines the port to be used to reach the receiver using the hardware-implemented port database. This enables the port to be determined dynamically based on the current state of the ports and the MLT group ID, so that an available port from the group of associated (MLT) ports can be selected for the packet. This enables the network device to accommodate multiple failures (multiple port/link failures) and quickly adapt by re-routing the packets away from ports that are down to ports that are guaranteed to be UP within the MLT. Since port failure notifications span multiple network devices within the cluster, the FDU may forward a packet to another port on a different node so that port selection within and between network devices may be implemented in a similar manner. This enables not only port selection from within a MLT having only local ports, but enables port selection to be implemented between ports implemented on separate nodes within a cluster so that port selection within a SMLT may be dynamically implemented. Additionally, since the nodes are able to select from between all other ports associated with the MLT/SMLT, traffic from the port that is down may be spread/distributed across the remaining ports of the MLT/SMLT rather than being shifted entirely to a particular alternate port. Likewise, multiple port failures and combinations of port failures may be accommodated without disrupting packet forwarding through the node cluster, since whenever a packet is received the port state database will be able to look for any available port that is UP and return the value of any available port for use by the FDUs.

Figure 12:
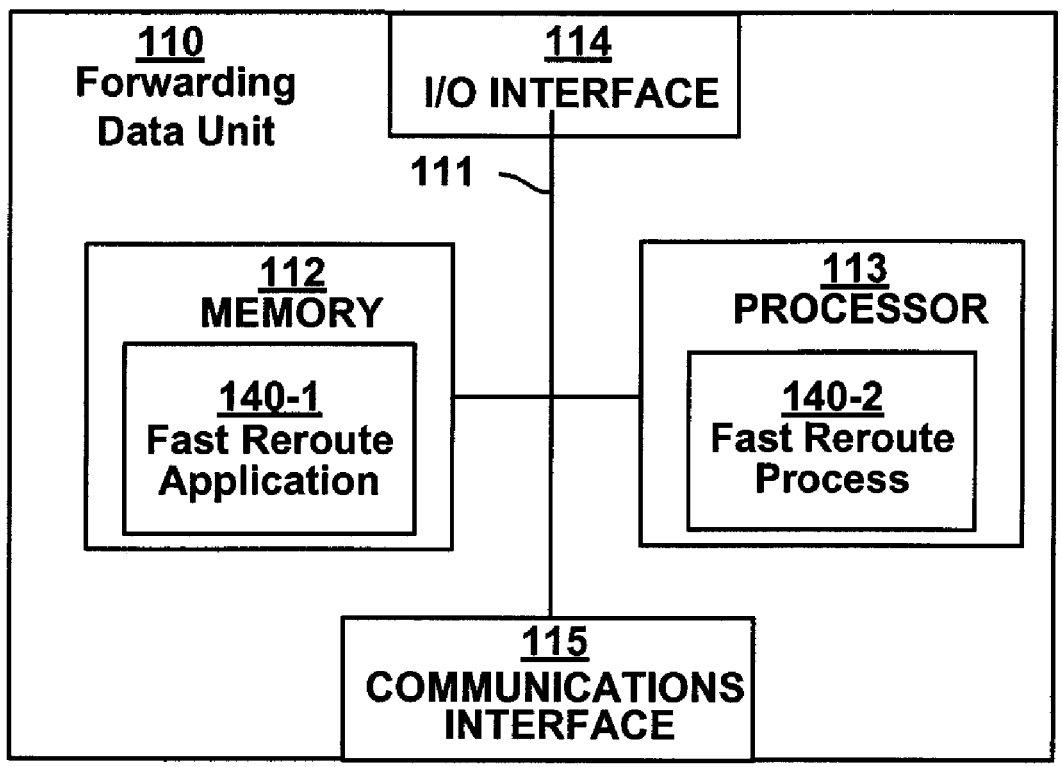
FIG. 12 illustrates an example computer system architecture for a network element that operates in accordance with embodiments of the invention.

FIG. 12 is a block diagram illustrating example architecture of a computer system (FDU) 110 that executes, runs, interprets, operates or otherwise performs a fast reroute operating application 140-1 and fast reroute operating process 140-2 suitable for use in explaining example configurations disclosed herein. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a fast reroute operating application 140-1 as explained herein. The fast reroute operating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of a fast reroute operating application 140-1. Execution of a fast reroute operating application 140-1 in this manner produces processing functionality in the fast reroute operating process 140-2. In other words, the fast reroute operating process 140-2 represents one or more portions or runtime instances of a fast reroute operating application 140-1 (or the entire a fast reroute operating application 140-1) performing or executing within or upon the processor 113 in the computerized device 110 at runtime.

It is noted that example configurations disclosed herein include the fast reroute operating application 140-1 itself (i.e., in the form of un-executed or non-performing logic instructions and/or data). The fast reroute operating application 140-1 may be stored on a computer readable medium (such as a floppy disk), hard disk, electronic, magnetic, optical, or other computer readable medium. A fast reroute operating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a fast reroute operating application 140-1 in the processor 113 as the fast reroute operating process 140-2. Those skilled in the art will understand that the computer system 110 may include other processes and/or software and hardware components, such as an operating system not shown in this example.

During operation, processor 113 of computer system 100 accesses memory system 112 via the interconnect 111 in order to launch, run, execute, interpret or otherwise perform the logic instructions of the fast reroute application 140-1. Execution of fast reroute application 140-1 produces processing functionality in fast reroute process 140-2. In other words, the fast reroute process 140-2 represents one or more portions of the fast reroute application 140-1 (or the entire application) performing within or upon the processor 113 in the computer system 100.

It should be noted that, in addition to the fast reroute process 140-2, embodiments herein include the fast reroute application 140-1 itself (i.e., the un-executed or non-performing logic instructions and/or data). The fast reroute application 140-1 can be stored on a computer readable medium such as a floppy disk, hard disk, or optical medium. The fast reroute application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of fast reroute application 140-1 in processor 113 as the fast reroute process 140-2. Those skilled in the art will understand that the computer system 100 can include other processes and/or software and hardware components, such as an operating system that controls allocation and use of hardware resources associated with the computer system 100.

Figure 13:
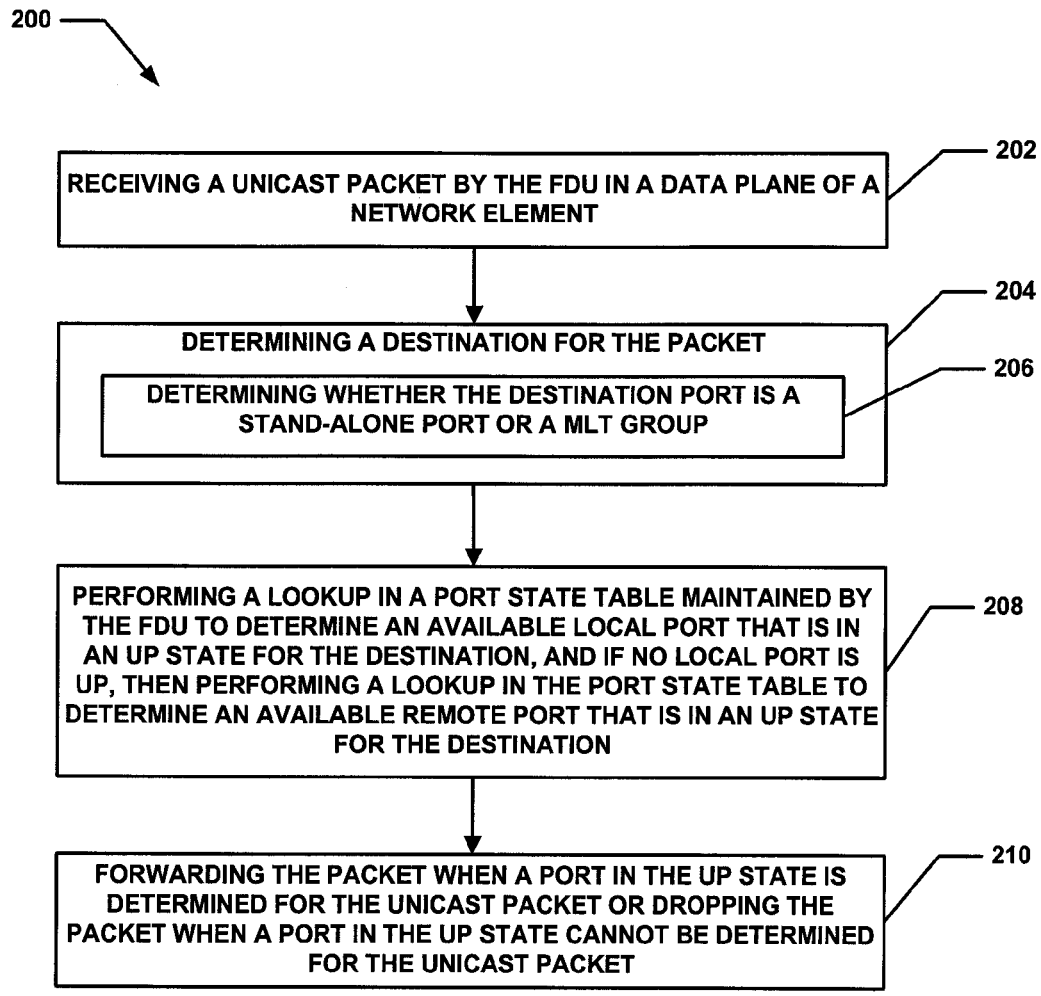
FIG. 13 comprises a flow diagram of a method for performing fast reroute of a unicast packet for stand alone ports in accordance with embodiments of the invention.
Figure 14:
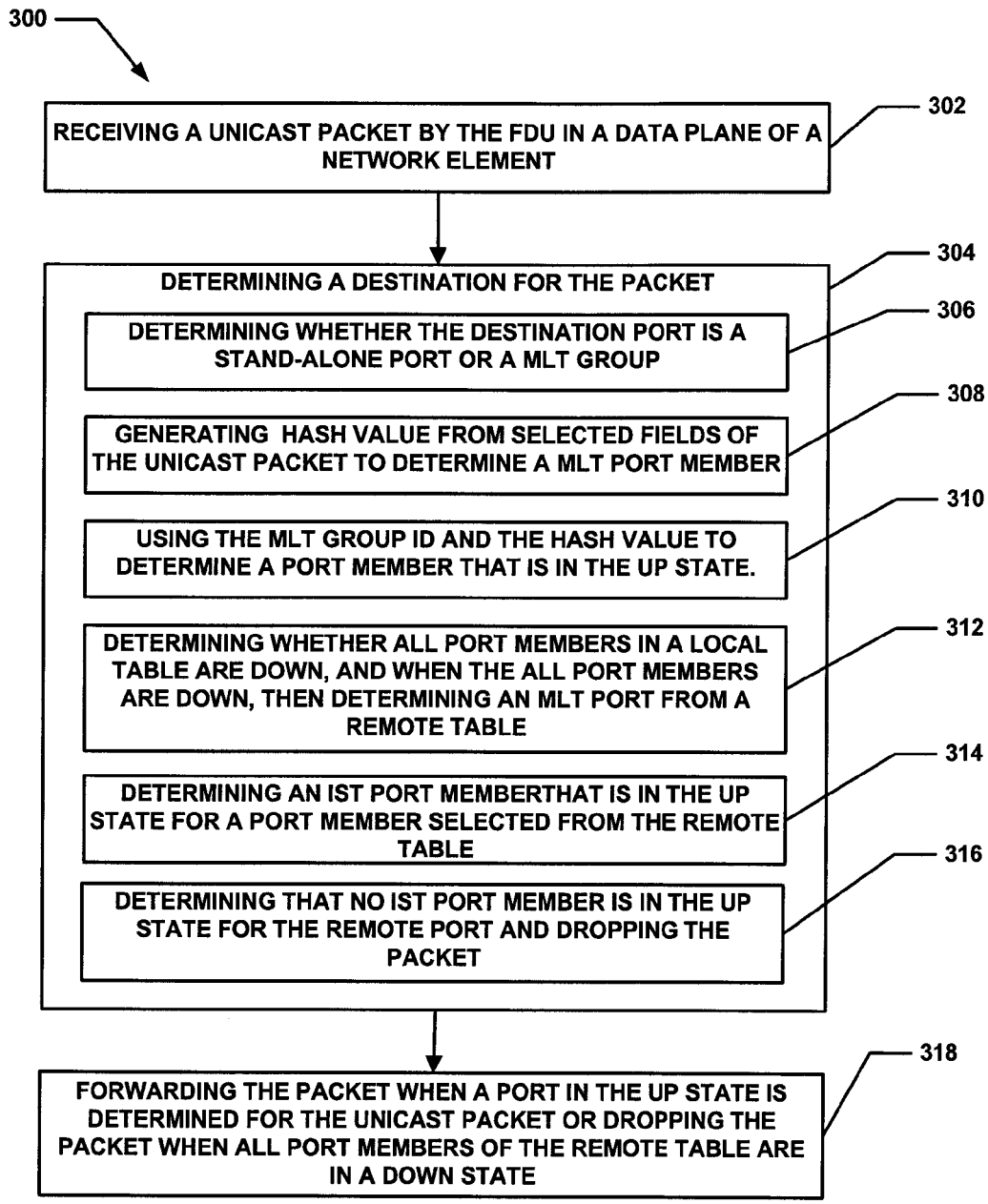
FIG. 14 comprises a flow diagram of a method for performing fast reroute of a unicast packet for multilink trunk ports in accordance with embodiments of the invention.

Flow diagrams of particular embodiments of the presently disclosed methods are depicted in FIGS. 13 and 14. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

FIG. 13 shows a particular embodiment of process 200 that may be implemented for performing fast reroute of a unicast packet. Process 200 begins with processing block 202 which recites receiving a unicast packet by the FDU in a data plane of a network element.

Processing block 204 states determining a destination for the packet. After the received unicast packet is processed, its forwarding destination is resolved to a destination port. This may be performed by the FDU in a conventional way, for example by performing a lookup in a forwarding database (filtering database for Ethernet).

Processing block 206 recites determining whether the destination port is a stand-alone port or a MLT group. If the FDU determines that the destination port is a stand-alone port, the FDU can either forward the packet directly to the destination port or may pass a request to the database control logic to determine whether the destination port is UP.

Processing block 208 discloses performing a lookup in a port state table maintained by the FDU to determine an available local port that is in an UP state for the destination, and if no local port is UP, then performing a lookup in the port state table to determine an available remote port that is in an UP state for the destination. Upon receipt of the request, the database control logic will query the local table to determine the status of the destination port and return the status to the FDU.

Processing block 210 recites forwarding the packet when a port in the UP state is determined for the unicast packet or dropping the packet when all port members of the remote table are in a DOWN state. If the destination port is UP, the FDU will forward the packet to the destination port. If not, the FDU will drop the packet. Note, that in this embodiment the state of a port is either UP or DOWN.

Referring now to FIG. 14, a flow diagram for a process 300 for performing fast reroute of a unicast packet for a MLT group is shown. Process 300 begins with processing block 202 which recites receiving a unicast packet by the FDU in a data plane of a network element.

Processing block 304 states determining a destination for the packet. After the received unicast packet is processed, its forwarding destination is resolved to a destination port.

Processing block 306 recites determining whether the destination port is a stand-alone port or a MLT group. In this case, the destination port is a MLT port member.

Processing block 308 discloses generating a hash value from selected fields of the unicast packet to determine a MLT port member. Processing block 310 states using the MLT group ID and the hash value to determine a port member that is in the UP state. The MLT group ID (MLT-ID) and the hash value will be passed to the database control logic and used by the database control logic to query the local table to obtain a port member that is UP.

Processing block 312 recites determining whether all port members in a local table are down, and when the all port members are down, then determining an MLT port from a remote table. The database control logic will preferentially select the port identified by the hash value within the MLT to query the status of that port first. If the MLT port associated with the hash value is UP, the database control logic will return the value of that port to the FDU. If that port is down, the database control logic will access the local database to determine if one of the other ports associated with the MLT is UP. If so, it will return the port ID of the first local port that it finds that is UP.

Processing block 314 discloses determining an IST port member that is in the UP state for a port member selected from the remote table. If one or more of the remote ports are available, the database logic will determine an IST port that is to be used to forward the packet to the remote network element associated with the remote port that is UP. The database control logic will then respond to the FDU with the IST port ID.

Processing block 316 states determining that no IST port member is in the UP state for the remote port and dropping the packet. If no IST port member is available, then the packet will be dropped Likewise, if no remote port is available, the packet will be dropped.

Processing block 318 recites forwarding the packet when a port in the UP state is determined for the unicast packet or dropping the packet when all port members of the remote table are in a DOWN state. If the destination port is UP, the FDU will forward the packet to the destination port. If not, the FDU will drop the packet (110).

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a Forwarding Data Unit (FDU) performs operations providing a fast reroute of a unicast packet within a network element to an available port associated with a multi-link trunk (MLT), the method comprising the steps of:
    receiving a unicast packet by said FDU in a data plane of a network element;
    determining a destination for the packet; and
    performing a lookup in a port state table maintained by the FDU to determine an available local port that is in an UP state for the destination, and if no local port is UP, then performing a lookup in the port state table to determine an available remote port that is in an UP state for the destination.

2. The method of claim 1 further comprising forwarding said packet when a port in the UP state is determined for said unicast packet or dropping said packet when a port in the UP state cannot be determined for said unicast packet.

3. The method of claim 1 wherein said determining a destination for said packet comprising determining whether said destination port is a stand-alone port or a MLT group.

4. The method of claim 3 wherein when said destination port is a MLT group, then generating a hash value from selected fields of said unicast packet to determine a MLT port member.

5. The method of claim 4 further comprising using an ID of said MLT group and said hash value to determine a port member that is in the UP state.

6. The method of claim 5 further comprising determining whether all port members in a local table are down, and when said all port members are down, then determining an MLT port from a remote table.

7. The method of claim 6 further comprising determining an Inter Switch Trunk (IST) port member that is in the UP state for a port member selected from said remote table.

8. The method of claim 7 further comprising determining that no IST port member is in the UP state for said remote port and dropping said packet.

9. A Forwarding Data Unit (FDU) comprising:
a memory;
a processor;
a communications interface;
an interconnection mechanism coupling the memory, the processor and the communications interface; and
wherein the memory is encoded with an application providing fast reroute of a unicast packet, that when performed on the processor, provides a process for processing information, the process causing the FDU to perform the operations of:
receiving a unicast packet by said FDU in a data plane of a network element;
determining a destination for the packet; and
performing a lookup in a port state table maintained by the FDU to determine an available local port that is in an UP state for the destination, and if no local port is UP, then performing a lookup in the port state table to determine an available remote port that is in an UP state for the destination.

10. The FDU of claim 9 further comprising said FDU forwarding said packet when a port in the UP state is determined for said unicast packet or dropping said packet when a port in the UP state cannot be determined for said unicast packet.

11. The FDU of claim 9 wherein said determining a destination for said packet comprising determining whether said destination port is a stand-alone port or a MLT group.

12. The FDU of claim 11 wherein when said destination port is a MLT group, then said FDU generates hash value from selected fields of said unicast packet to determine a MLT port member.

13. The FDU of claim 12 further comprising said FDU using an ID of said MLT group and said hash value to determine a port member that is in the UP state.

14. The FDU of claim 13 further comprising said FDU determining whether all port members in a local table are down, and when said all port members are down, then determining an MLT port from a remote table.

15. The FDU of claim 14 further comprising said FDU determining an Inter Switch Trunk (IST) port member that is in the UP state for a port member selected from said remote table.

16. The FDU of claim 15 further comprising said FDU determining that no IST port member is in the UP state for said remote port and dropping said packet.

17. A non-transitory computer readable storage medium having computer readable code thereon for providing fast reroute of a unicast packet, the medium including instructions in which a Forwarding Data Unit (FDU) performs operations comprising:
receiving a unicast packet by said FDU in a data plane of a network element;
determining a destination for the packet; and
performing a lookup in a port state table maintained by the FDU to determine an available local port that is in an UP state for the destination, and if no local port is UP, then performing a lookup in the port state table to determine an available remote port that is in an UP state for the destination.

18. The computer readable storage medium of claim 17 further comprising instructions in which said Forwarding Data Unit (FDU) performs operations comprising forwarding said packet when a port in the UP state is determined for said unicast packet or dropping said packet when a port in the UP state cannot be determined for said unicast packet.

19. The computer readable storage medium of claim 17 wherein said determining a destination for said packet comprising determining whether said destination port is a stand-alone port or a MLT group.

20. The computer readable storage medium of claim 19 wherein when said destination port is a MLT group, then generating a hash value from selected fields of said unicast packet to determine a MLT port member.

21. The computer readable storage medium of claim 20 further comprising using an ID of said MLT group and said hash value to determine a port member that is in the UP state.

* * * * *